Patented Dec. 9, 1930

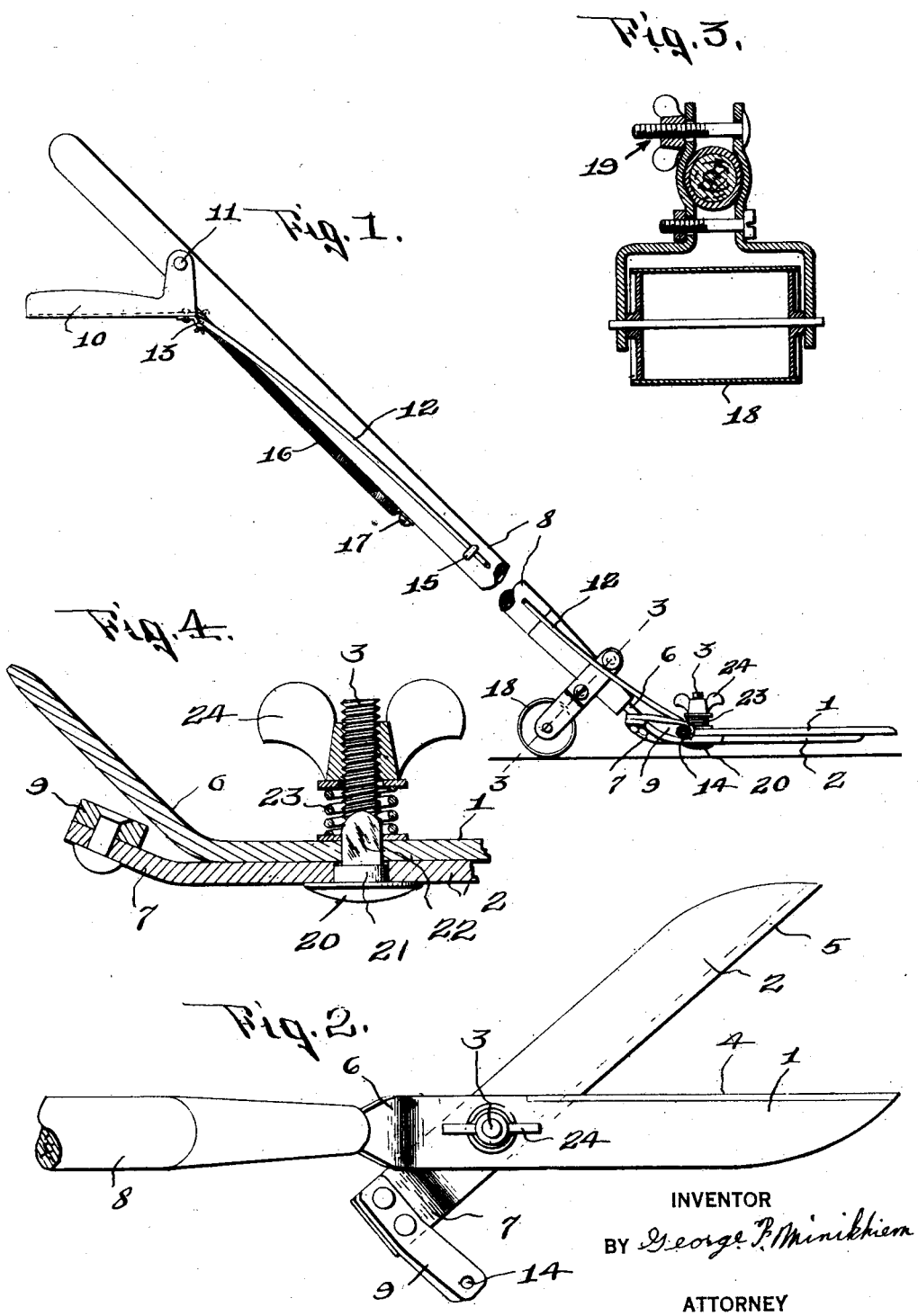

1,784,022

UNITED STATES PATENT OFFICE

GEORGE F. MINIKHIEM, OF SYRACUSE, NEW YORK

LAWN-TRIMMING DEVICE

Application filed December 19, 1928. Serial No. 327,108.

This invention has for its object a lawn trimming device particularly adapted for trimming grass around grave stones and the like and which is highly efficient and durable in use and can be manufactured at a very reasonable cost.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a side elevation of my lawn trimming device.

Figure 2 is an enlarged fragmentary plan view of parts seen in Figure 1.

Figure 3 is a sectional view taken on line 3—3, Figure 1.

Figure 4 is an enlarged sectional view of the pivot for the blades.

My invention comprises, generally, a stationary blade and a movable blade pivotally connected together and provided with coacting cutting edges in front of said pivot, a handle portion on said stationary blade extending at an angle from the rear end thereof and provided with a pinch lever at its extreme end, an arm extending at an angle from the rear end of the movable blade, a rod connecting the pinch lever and said arm for moving said movable blade to its closed position, a spring connected to said rod and to the handle for returning said movable blade to its open position, and a roller adjustably mounted on the lower end of said handle for guiding said device.

1 designates the stationary blade and 2 the movable blade pivotally connected together at 3 by a spring tensioned pivot and provided with coacting cutting edges 4 and 5 in front of said pivot 3.

The rear ends of the blades are bent upwardly at 6 and 7 and the stationary blade 1 is provided with a handle portion 8 of sufficient length for operating my device from a standing position.

The movable blade 2 is provided with an angular arm 9 extending from its rear end and the handle 8 is provided with a pinch lever 10 pivoted at 11 to said handle.

12 is a rod pivotally connected at 13 to the pinch lever 10 and at 14 to the outer end of the angle lever 9 for operating the movable blade 2 from its normally open position to its closed postion.

The rod 12 is preferably guided along the side of the handle 8 as by eyes 15 fixed to said handle.

The movable blade 2 is preferably returned to its open position by a coiled spring 16 secured at 17 to the handle and to the pivoted end 13 of the rod 12.

18 is a roller adjustably mounted on the lower end of the handle 8 by any suitable clamping means as 19 for guiding my trimming device and determining the desired distance from the ground the cut is to be made.

The pivot 3 for the blades 1 and 2 is so constructed that the operation of the device will not disturb the adjustment of the tension thereon and as here shown comprises a bolt 20 having a round portion 21 coacting with the movable blade 2 and a square portion 22 coacting with the stationary blade 1, the head of the bolt coacting with the movable blade 2 and the spring 23 tensioned by the wing-nut 24 coacting with the stationary blade 1.

From the foregoing, it will be obvious that the guiding roller can be adjusted to any desired height and that the device can be operated readily from a standing position for trimming around the ground or that the device may be used for trimming hedges and the like as it is of very light construction and has a very powerful leverage and if desired, the roller may be removed for this purpose.

What I claim is:

A device of the character described comprising a stationary blade having a movable blade pivotally connected to the lower side thereof, a handle portion on said stationary blade extending at an inclination from the rear end thereof and provided with a pinch handle at its upper end, an arm extending at an angle from the rear end of the movable blade, a rod connecting the pinch handle and said arm for moving said blade to its closed position, a coiled spring connected to the upper end of said rod and to the lower end of said handle for moving said blade to its open position, a roller having a supporting member encircling and adjustable along the lower end of said handle, means for pivotally connecting said blades together comprising a bolt having a head arranged to coact with the lower side of the movable blade, a circular portion extending into a circular passage in said movable blade, a squared portion on said bolt coacting with a squared passage in the stationary blade, a wing nut threading on the upper end of said bolt and a spring interposed between the upper side of said stationary blade and said wing nut.

In testimony whereof, I have hereunto signed my name, at Syracuse, in the county of Onondaga and State of New York, this 3rd day of December, 1928.

GEORGE F. MINIKHIEM.